(12) United States Patent
Fu

(10) Patent No.: US 11,297,239 B2
(45) Date of Patent: Apr. 5, 2022

(54) LENS CONTROL METHOD AND MOBILE TERMINAL

(71) Applicant: VIVO MOBILE COMMUNICATION CO., LTD., Chang'an Dongguan (CN)

(72) Inventor: Conghua Fu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/980,604

(22) PCT Filed: Feb. 28, 2019

(86) PCT No.: PCT/CN2019/076439
§ 371 (c)(1),
(2) Date: Sep. 14, 2020

(87) PCT Pub. No.: WO2019/174464
PCT Pub. Date: Sep. 19, 2019

(65) Prior Publication Data
US 2021/0250508 A1    Aug. 12, 2021

(30) Foreign Application Priority Data
Mar. 14, 2018   (CN) .......................... 201810208779.4

(51) Int. Cl.
*H04N 5/225* (2006.01)
*H04N 5/232* (2006.01)
*H04M 1/02* (2006.01)

(52) U.S. Cl.
CPC ...... *H04N 5/23287* (2013.01); *H04M 1/0264* (2013.01); *H04N 5/2254* (2013.01); *H04M 2250/12* (2013.01); *H04M 2250/20* (2013.01)

(58) Field of Classification Search
CPC ............... H04N 5/2257; H04N 5/2258; H04N 5/23248; H04N 5/23258; H04N 5/23264; H04N 5/23287; H04M 1/0264
(Continued)

(56) References Cited

U.S. PATENT DOCUMENTS 9,681,052 B1    6/2017  Lewkow
2014/0132738 A1*  5/2014  Ogura ..................... G02B 7/02
                                                            348/47
(Continued)

FOREIGN PATENT DOCUMENTS

CN    200969608 Y    10/2007
CN    204859340 U    12/2015
(Continued)

OTHER PUBLICATIONS

International Search Report & Written Opinion related to Application No. PCT/CN2019/076439; dated Sep. 24, 2020.
(Continued)

*Primary Examiner* — Anthony J Daniels
(74) *Attorney, Agent, or Firm* — von Briesen & Roper, s.c.

(57) ABSTRACT

Provided are a lens control method and a mobile terminal. The method includes: acquiring a direction of movement of a mobile terminal; determining a target driving direction of a lens in the photographing state according to the direction of movement; and driving the lens to move in the target driving direction.

15 Claims, 5 Drawing Sheets

(58) Field of Classification Search
USPC .................................................. 348/208.99
See application file for complete search history.

(56) References Cited

U.S. PATENT DOCUMENTS

| | | | |
|---|---|---|---|
| 2015/0304563 A1* | 10/2015 | Cho ................... | H04N 5/23258 348/208.11 |
| 2016/0165137 A1* | 6/2016 | Kang ................. | H04N 5/23287 348/208.4 |
| 2016/0216527 A1 | 7/2016 | Juhola et al. | |
| 2016/0316150 A1 | 10/2016 | Eromaki | |
| 2017/0094182 A1 | 3/2017 | Miller et al. | |
| 2017/0201684 A1* | 7/2017 | Kang ..................... | H04N 5/247 |
| 2018/0255219 A1* | 9/2018 | Ramaprakash ........ | H04N 5/247 |
| 2019/0089906 A1* | 3/2019 | Joo ................... | H04N 5/23258 |
| 2020/0053287 A1 | 2/2020 | Zhang et al. | |
| 2020/0192068 A1* | 6/2020 | Laroia ...................... | G02B 5/08 |
| 2020/0322515 A1* | 10/2020 | Jia ........................ | G06F 1/1686 |

FOREIGN PATENT DOCUMENTS

| | | |
|---|---|---|
| CN | 106331240 A | 1/2017 |
| CN | 107040722 A | 8/2017 |
| CN | 107800968 A | 3/2018 |
| CN | 108337381 A | 7/2018 |
| JP | 2006222794 A | 8/2006 |
| JP | 2012123092 A | 6/2012 |
| WO | 2014207298 A1 | 12/2014 |
| WO | 2017119602 A1 | 7/2017 |

OTHER PUBLICATIONS

Chinese Search Report for related Application No. 201810208779.4; dated Nov. 16, 2018.

Extended European Search Report for related Application No. 19766823.9; dated Apr. 6, 2021.

* cited by examiner

LENS CONTROL METHOD AND MOBILE TERMINAL

CROSS-REFERENCE TO RELATED APPLICATION

This patent application is a 35 USC § 371 U.S. national stage of International Application No. PCT/CN2019/076439 filed on Feb. 28, 2019, which claims a priority to the Chinese patent application No. 201810208779.4 filed in China on Mar. 14, 2018, a disclosure of which is incorporated herein by reference in its entirety.

TECHNICAL FIELD

The present disclosure relates to the field of communication technology, in particular to a lens control method and a mobile terminal.

BACKGROUND

Many mobile terminal products are configured with an optical image stabilization (Optical Image Stabilization, OIS) function to improve their photographing performance. The basic principle of optical image stabilization is as follows: slight jittering occurs during photographing due to factors such as shaky hands, mobile terminal detects the direction of jittering and the angular velocity by means of a gyroscope, and then controls an optical image stabilization motor driver circuit to control the offset of a camera lens so as to compensate for the effect of jittering, to achieve the purpose of image stabilization.

The gyroscope in a mobile terminal in the related art is assembled on a main printed circuit board or in the camera module. However, when multiple camera modules are provided in the mobile terminal, one gyroscope can generally be used by only one camera module. This may lead to a high production cost of the mobile terminal.

SUMMARY

Some embodiments of the present disclosure provide a lens control method and a mobile terminal, to solve the problem of a high production cost of the mobile terminal caused by the configuration of motion sensors on the camera modules in the related art.

The present disclosure solves the technical problem mentioned above in the following manner:

In a first aspect, an embodiment of the present disclosure provides a lens control method, which is applied to a mobile terminal. The method includes: acquiring a direction of movement of the mobile terminal; determining a target driving direction of a lens in a photographing state according to the direction of movement; and driving the lens to move in the target driving direction.

In a second aspect, an embodiment of the present disclosure further provides a mobile terminal. The mobile terminal includes: an acquisition module, configured to acquire a direction of movement of the mobile terminal; a driving direction determination module, configured to determine a target driving direction of a lens in the photographing state according to the direction of movement; and a control module, configured to drive the lens to move in the target driving direction.

In some embodiments of the present disclosure, a direction of movement of the mobile terminal is acquired, a target driving direction of the lens in the photographing state is determined according to the direction of movement, and the lens is driven to move in the target driving direction. Thus, such a method is applied to the mobile terminal, two or more camera modules can share one motion sensor in the mobile terminal, in which case not only the quantity of motion sensors can be decreased and the cost of the mobile terminal can be significantly reduced, but also the structural space of the mobile terminal can be saved, so that the mobile terminal can be made lighter and slimmer. Also, optical image stabilization control for two or more camera modules in the mobile terminal is enabled and the photographing performance of the mobile terminal is improved.

DETAILED DESCRIPTION

The technical solutions in some embodiments of the present disclosure will be described clearly and completely with reference to the drawings in some embodiments of the present disclosure. Obviously, the described embodiments are some of the embodiments of the present disclosure, but not all of them. Based on the embodiments in the present disclosure, all other embodiments obtained by those of ordinary skill in the art without creative effort shall fall within the scope of the present disclosure.

Figure 1:
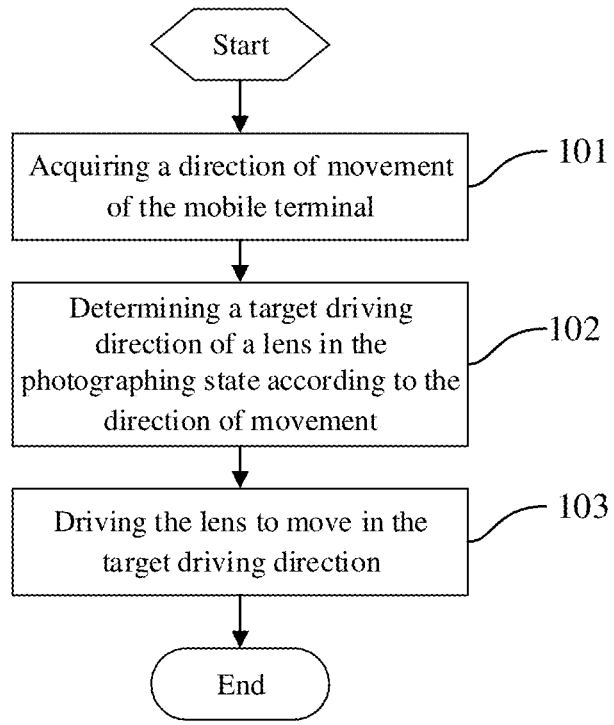
FIG. 1 is a flowchart of a lens control method according to the present disclosure.

Referring to FIG. 1, a flowchart of a lens control method according to some embodiments of the present disclosure is illustrated. The lens control method is applied to a mobile terminal. The implementation process of this method is described in detail below with reference to FIG. 1.

Step 101: acquiring a direction of movement of the mobile terminal.

It is noted that the direction of movement of the mobile terminal can be acquired by a motion sensor.

Step 102: determining a target driving direction of a lens in the photographing state according to the direction of movement.

Here, the lens is a lens in a target camera module in the photographing state.

It is noted that the mobile terminal may have one or more camera modules.

Step 103: driving the lens to move in the target driving direction.

It is noted that, specifically, by controlling the motor in the target camera module, the lens may be driven to move in the target driving direction.

In the lens control method according to some embodiments of the present disclosure, a direction of movement of the mobile terminal is acquired, a target driving direction of a lens in the photographing state is determined according to the direction of movement, and the lens is driven to move in the target driving direction. When such a method is applied to the mobile terminal, two or more camera modules can share one motion sensor in the mobile terminal, in which case not only the quantity of motion sensors can be decreased and the cost of the mobile terminal can be significantly reduced, but also the structural space of the mobile terminal can be saved, so that the mobile terminal is made lighter and slimmer. Also, this method enables optical image stabilization control for two or more camera modules in the mobile terminal and improves the photographing performance of the mobile terminal.

On the basis of the embodiment shown in FIG. 1, in an optional implementation, the Step 102 may include: determining the target driving direction corresponding to the direction of movement according to a preset correspondence between lens driving directions and directions of movement with respect to coordinate axes in a preset reference coordinate system, wherein the preset reference coordinate system is used to represent the direction of movement of the mobile terminal.

Figure 2:
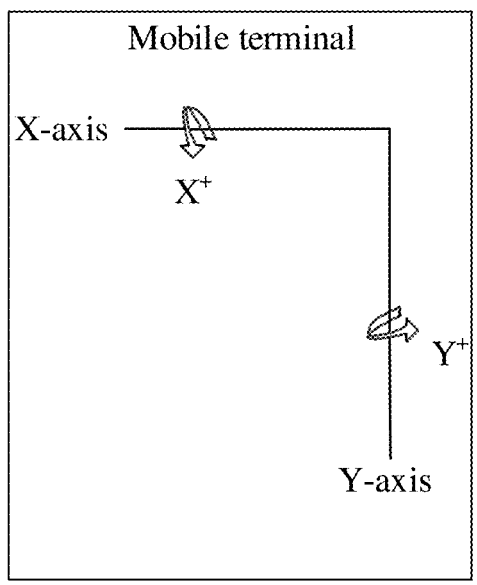
FIG. 2 is a schematic view of a preset reference coordinate system according to the present disclosure.

It is noted that the preset reference coordinate system is a coordinate system with respect to the mobile terminal itself. In some embodiments of the present disclosure, as shown in FIG. 2, the direction of a short side of the mobile terminal is defined as the abscissa axis, i.e. the X-axis, and the direction of a long side thereof is defined as the ordinate axis, i.e., the Y-axis. The direction of counterclockwise rotation around the X-axis is defined as the positive direction of the X-axis, denoted as $X^+$, and the direction of counterclockwise rotation around the Y-axis is defined as the positive direction of the Y-axis, denoted as $Y^+$.

Here, the directions of movement with respect to coordinate axes in the preset reference coordinate system include: a direction of rotation around the abscissa axis (including the positive direction of the X-axis and the negative direction of the X-axis) and a direction of rotation around the ordinate axis (including the positive direction of the Y-axis and the negative direction of the Y-axis).

It is noted that the camera modules at different positions on the mobile terminal have different lens driving directions for the same direction of movement with respect to a coordinate axis in the preset reference coordinate system.

As the directions of movement of the mobile terminal corresponding to the camera modules at different positions that are acquired by the mobile terminal (here, specifically referring to the direction of rotation of the mobile terminal during jittering) are different directions of movement with respect to coordinate axes in the preset reference coordinate system, according to preset correspondences, corresponding to the respective camera modules, between lens driving directions and directions of movement with respect to coordinate axes in the preset reference coordinate system, the mobile terminal can control the image stabilization driving motors in the respective camera modules to drive the image stabilization lenses to move in the target driving directions corresponding to the directions of movement, so as to compensate the ray offset caused by jittering of the mobile terminal, so that the photographed object is eventually imaged clearly on the image sensor, thereby improving the photographing performance of the mobile terminal.

It is further noted that the motion sensor also acquires the rotational angular velocity of the mobile terminal during jittering. The mobile terminal calculates to obtain the amount of position offset of the image stabilization lens according to the rotational angular velocity by using a preset algorithm and acquires the magnitude of a compensational displacement of the image stabilization lens according to the amount of position offset.

That is, the mobile terminal controls the image stabilization driving motor to drive the image stabilization lens to move in the target driving direction corresponding to the direction of movement, and controls the image stabilization lens to move over a distance that is equal to the magnitude of the compensational displacement.

On the basis of the embodiment shown in FIG. 1, in another optional implementation, the lens is a lens in a target camera module in a photographing state. The target camera module is a first camera module including a first image stabilization lens, a first optical image stabilization motor connected to the first image stabilization lens and a first driver chip connected to the first optical image stabilization motor.

Accordingly, Step 101 may include acquiring a first direction of movement of the mobile terminal; Step 102 may include determining a first target driving direction corresponding to the first direction of movement according to a preset first correspondence between driving directions of the first image stabilization lens and directions of movement with respect to coordinate axes in a preset reference coordinate system; and Step 103 may include controlling the first optical image stabilization motor to drive the first image stabilization lens to move in the first target driving direction.

Here, by performing the steps described above, when the first camera module is in an operation state (i.e., being used for photographing), the ray offset caused by uttering of the mobile terminal is compensated, so that the photographed object is eventually imaged clearly on the image sensor of the first camera module, thereby improving the photographing performance of the mobile terminal.

In yet another optional implementation, the target camera module in the photographing state is a second camera module including a second image stabilization lens, a second optical image stabilization motor connected to the second image stabilization lens and a second driver chip connected to the second optical image stabilization motor. The first camera module and the second camera module are a front-facing camera and a rear-facing camera respectively, or the first camera module and the second camera module are a rear-facing camera and a front-facing camera respectively.

Accordingly, Step 101 may include acquiring a second direction of movement of the mobile terminal; Step 102 may include determining a second target driving direction corresponding to the second direction of movement according to a preset second correspondence between driving directions of the second image stabilization lens and directions of movement with respect to coordinate axes in a preset reference coordinate system; and Step 103 may include controlling the second optical image stabilization motor to drive the second image stabilization lens to move in a second target driving direction, the first target driving direction being opposite to the second target driving direction.

Here, by performing the steps described above, when the second camera module is in an operation state (i.e., being used for photographing), the ray offset caused by jittering of the mobile terminal is compensated, so that the photographed object is eventually imaged clearly on the image sensor of the second camera module, thereby improving the photographing performance of the mobile terminal.

In still another optional implementation, the lens is a lens in a target camera module in the photographing state. The target camera module is a third camera module with a rotation angle range from 0° to 180°, including a third image stabilization lens, a third optical image stabilization motor connected to the third image stabilization lens and a third driver chip connected to the third optical image stabilization motor.

Accordingly, Step 101 may include acquiring a direction of movement of the mobile terminal and a current rotation angle of the third camera module; Step 102 may include determining a third target driving direction that corresponds to the direction of movement according to a preset third correspondence, corresponding to the current rotation angle, between driving directions of the image stabilization lens and directions of movement with respect to coordinate axes in the preset reference coordinate system; and Step 103 may include controlling the image stabilization driving motor to drive the image stabilization lens to move in the third target driving direction.

It is noted that the third camera module serves as the rear-facing camera in case that the current rotation angle of the third camera module is 0°; and the third camera module serves as the front-facing camera in case that the current rotation angle of the third camera module is 180°. A target driving direction corresponding to the third camera module acting as the rear-facing camera is opposite to a target driving direction corresponding to the third camera module acting as the front-facing camera.

Here, by means of a third camera module capable of implementing at least two photographing modes, the optical image stabilization function of a camera module corresponding to two photographing modes in the mobile terminal can be achieved, thereby improving the photographing performance of the mobile terminal.

Figure 3:
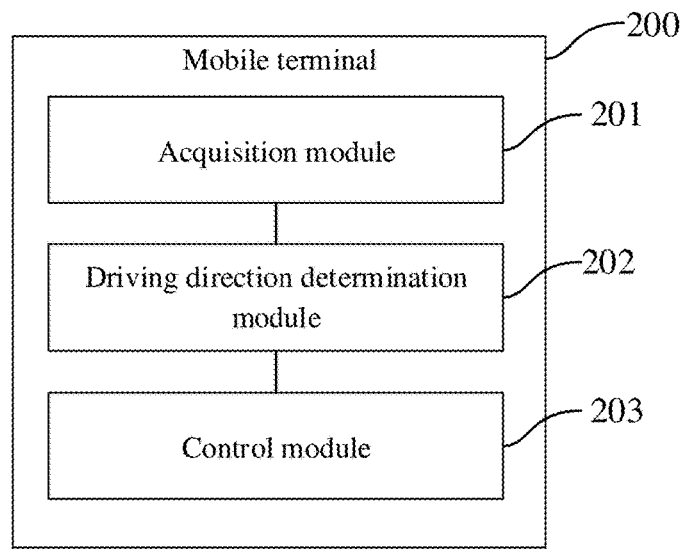
FIG. 3 is a schematic structural view of a mobile terminal according to the present disclosure.

Referring to FIG. 3, a schematic structural view of a mobile terminal according to some embodiments of the present disclosure is illustrated. The mobile terminal 200 includes: an acquisition module 201 configured to acquire a direction of movement of the mobile terminal; a driving direction determination module 202 configured to determine a target driving direction of a lens in the photographing state according to the direction of movement; and a control module 203 configured to drive the lens to move in the target driving direction.

On the basis of FIG. 3, optionally, the driving direction determination module 202 includes a driving direction determination submodule configured to determine a target driving direction of a lens in the target camera module that corresponds to the direction of movement according to a preset correspondence between lens driving directions and directions of movement with respect to the coordinate axes in the preset reference coordinate system, wherein the preset reference coordinate system is used to represent the direction of movement of the mobile terminal.

Figure 4:
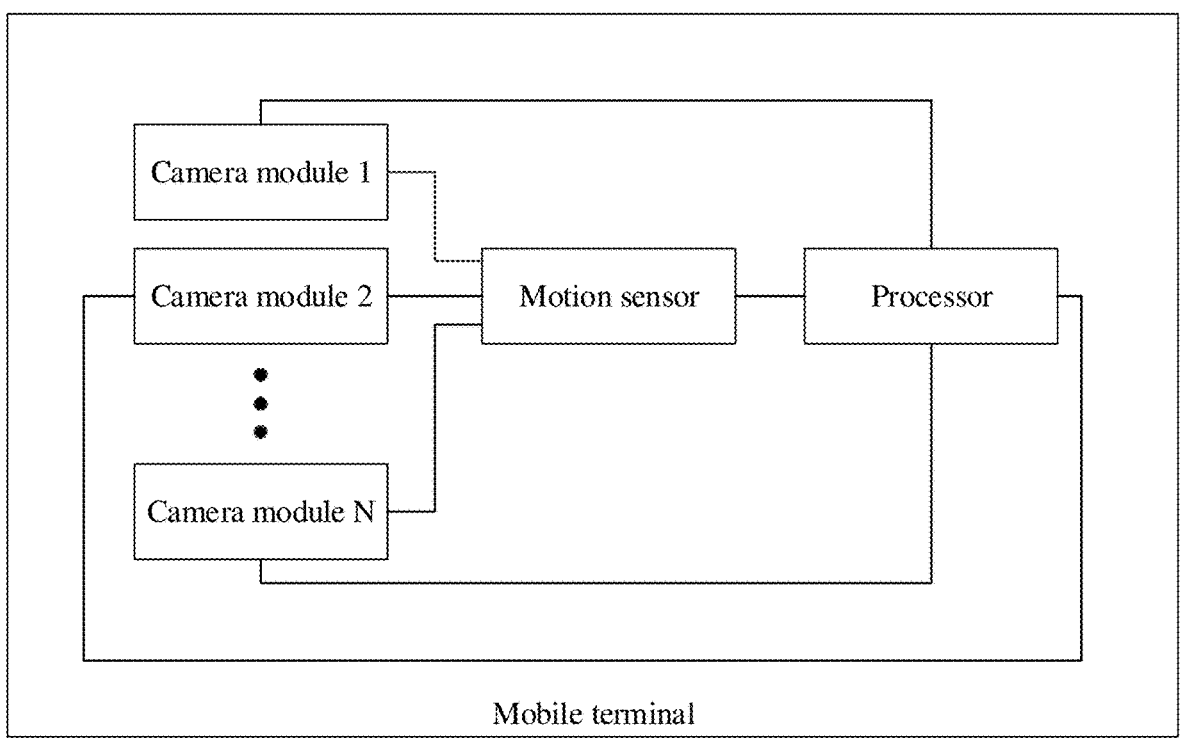
FIG. 4 is another schematic structural view of a mobile terminal according to the present disclosure.

As shown in FIG. 4, the mobile terminal 200 further includes a motion sensor, a processor and N camera modules, N being a positive integer. The motion sensor is connected to at least one of the camera modules and the processor. The motion sensor is configured to acquire the direction of movement of the mobile terminal. The processor is connected to the N camera modules. Each of the camera modules includes an image stabilization lens, an optical image stabilization motor connected to the image stabilization motor and a driver chip connected to the optical image stabilization motor. The processor or the driver chip includes the acquisition module, the driving direction determination module and the control module.

Here, the mobile terminal includes N camera modules, i.e., a camera module 1, a camera module 2, . . . , a camera module N, where N≥1 and N is a positive integer.

Optionally, the processor in this embodiment is a central processing unit of the mobile terminal.

It is noted that the processor is connected to each of the at least one camera modules. Data transmission may occur between the processor and the camera modules.

Here, the processor can identify the target camera module currently being used for photographing from among the at least one camera modules by detecting status flags of the camera modules.

It is noted that the motion sensor includes an acceleration sensor, a gyroscope, a gravity sensor, a linear accelerometer, a rotation vector sensor and an inertial measurement unit (Inertial Measurement Unit, IMU) having an accelerometer and a gyroscope, or the like.

Specifically, the motion sensor is connected to the driver chip in the camera module and is configured to transfer the acquired motion data of the mobile terminal to the driver chip. Specifically, the motion sensor is configured to transfer the acquired jittering data about jittering of the mobile terminal to the driver chip. Here, the jittering data includes the direction of rotation and rotational angular velocity of the mobile terminal during jittering.

Optionally, in some embodiments of the present disclosure, the motion sensor is a gyroscope.

It is noted that the camera modules at different positions on the mobile terminal have different driving directions of the image stabilization lens for the same direction of movement with respect to a coordinate axis in the preset reference coordinate system.

As the directions of movement of the mobile terminal corresponding to the camera modules at different positions that are acquired by the processor of the mobile terminal (here, specifically referring to the direction of rotation of the mobile terminal during jittering) are different directions of movement with respect to coordinate axes in the preset reference coordinate system, or the directions of movement of the mobile terminal acquired by the driver chips of the camera modules at different positions on the mobile terminal are different directions of movement with respect to coordinate axes in the preset reference coordinate system, according to preset correspondences, corresponding to the respective camera modules, between image stabilization lens driving directions and directions of movement with respect to coordinate axes in the preset reference coordinate system, the processor or the respective driver chips can control the image stabilization driving motors in the respective camera modules to drive the image stabilization lenses to move in the target driving directions corresponding to the directions of movement, so as to compensate the ray offset caused by jittering of the mobile terminal, so that the photographed object is eventually imaged clearly on the image sensor, thereby improving the photographing performance of the mobile terminal.

It is further noted that the motion sensor also acquires the rotational angular velocity of the mobile terminal during jittering. The processor or the driver chip calculates the amount of position offset of the image stabilization lens according to the rotational angular velocity by using a preset algorithm and acquires the magnitude of compensational displacement for the image stabilization lens according to the amount of position offset.

That is, the processor or the driver chip controls the image stabilization driving motor to drive the image stabilization lens to move in the target driving direction corresponding to the direction of movement and controls the image stabilization lens to move over a distance that is equal to the magnitude of the compensational displacement.

Optionally, the motion sensor is provided on the main printed circuit board of the mobile terminal or in one of the camera modules.

Figure 5:
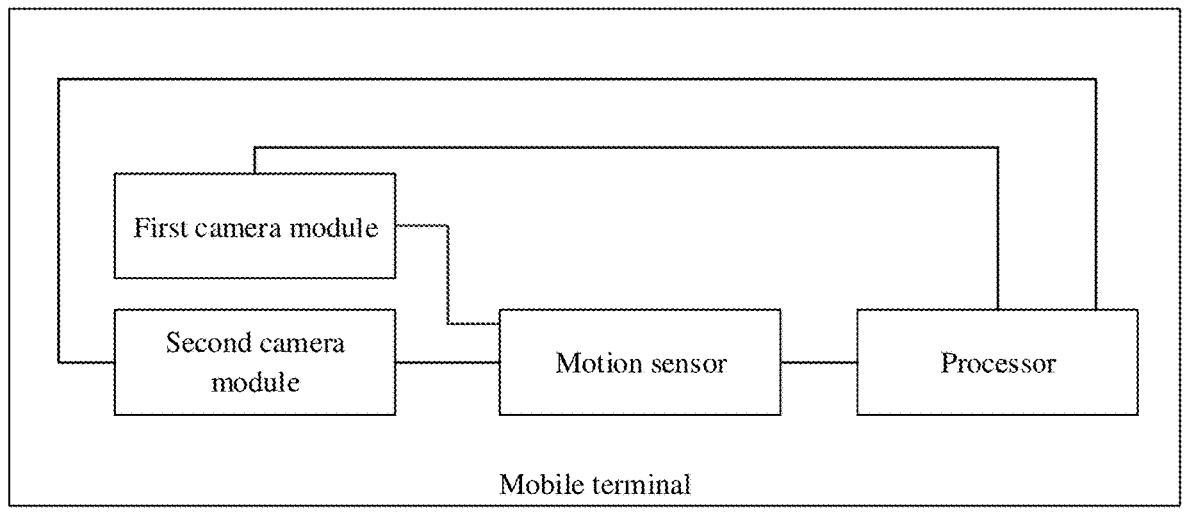
FIG. 5 is yet another schematic structural view of a mobile terminal according to the present disclosure.

Optionally, as shown in FIG. 5, the mobile terminal includes a first camera module and a second camera module, the motion sensor is provided on the main printed circuit board of the mobile terminal, and the motion sensor is connected to the first camera module and the second camera module.

Optionally, the mobile terminal includes a first camera module and a second camera module, and the motion sensor is provided inside the first camera module or the second camera module.

Figure 6:
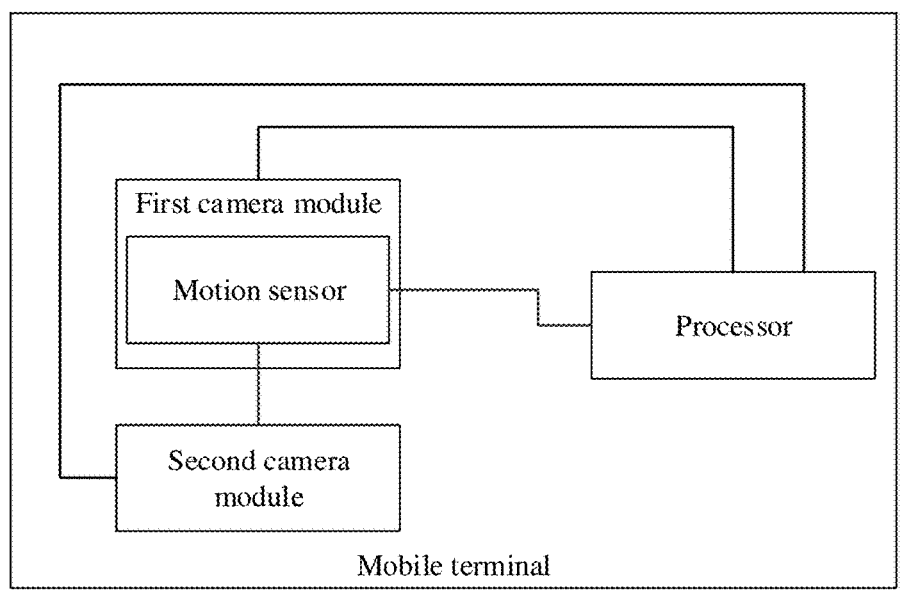
FIG. 6 is still another schematic structural view of a mobile terminal according to the present disclosure.

In case that the motion sensor is provided inside the first camera module, the motion sensor is connected to the second camera module, as shown in FIG. 6.

Figure 7:
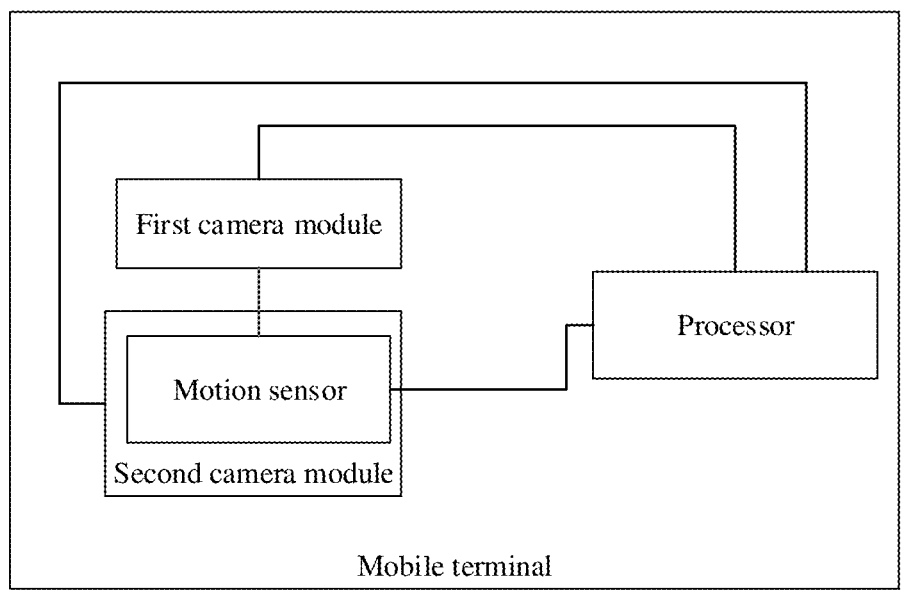
FIG. 7 is yet still another schematic structural view of a mobile terminal according to the present disclosure.

In case that the motion sensor is provided inside the second camera module, the motion sensor is connected to the first camera module, as shown in FIG. 7.

As explained in the optional embodiments described above, the motion sensor may be provided in the first camera module, or in the second camera module, or on the main printed circuit board (Printed Circuit Board, PCB) of the mobile terminal.

Specifically, the motion sensor is connected to the first camera module and second camera module via a data bus, so as to achieve data transmission and control.

Here, the data bus is typically a universal standard bus such as inter-integrated circuit (Inter-Integrated Circuit, I2C), improved inter integrated circuit (Improved Inter Integrated Circuit, I3C), serial peripheral interface (Serial Peripheral Interface, SPI) or another type of bus.

Here, at least two connection manners may be implemented. In one manner, the first camera module and the second camera module are connected to the motion sensor using the same bus.

The motion sensor differentiates between the command from the first camera module and the command from the second camera module according to the packet markings. The first camera module and the second camera module can filter the data sent to them from the motion sensor by differentiating between the packet markings.

In another manner, the first camera module and the second camera module are connected to the motion sensor via separate busses. The motion sensor can communicate with the first camera module and the second camera module freely without interference from each other.

On the basis of the above embodiments illustrated in FIG. 5 or FIG. 6 or FIG. 7, in an optional implementation, the first camera module includes a first image stabilization lens, a first optical image stabilization motor connected to the first image stabilization lens and a first driver chip connected to the first optical image stabilization motor.

In case that the target camera module in the photographing state is the first camera module, the first driver chip or the processor is specifically configured to acquire a first direction of movement of the mobile terminal; determine a first target driving direction corresponding to the first direction of movement according to a preset first correspondence between driving directions of the first image stabilization lens and directions of movement with respect to coordinate axes in a preset reference coordinate system; and control the first optical image stabilization motor to drive the first image stabilization lens to move in the first target driving direction.

Here, In case that the target camera module in the photographing state is the first camera module, the foregoing processing by the first driver chip or the processor can compensate the ray offset caused by jittering of the mobile terminal, so that the photographed object is eventually imaged clearly on the image sensor of the first camera module, thereby improving the photographing performance of the mobile terminal.

On the basis of the above embodiments illustrated in FIG. 5 or FIG. 6 or FIG. 7, in another optional implementation, the second camera module includes a second image stabilization lens, a second optical image stabilization motor connected to the second image stabilization lens and a second driver chip connected to the second optical image stabilization motor.

In case that the target camera module in the photographing state is the second camera module, the second driver chip or the processor is specifically configured to acquire a second direction of movement of the mobile terminal; determine a second target driving direction corresponding to the second direction of movement according to a preset second correspondence between driving directions of the second image stabilization lens and directions of movement with respect to coordinate axes in the preset reference coordinate system; and control the second optical image stabilization motor to drive the second image stabilization lens to move in the second target driving direction.

Here, In case that the target camera module in the photographing state is the second camera module, the foregoing processing by the second driver chip or the processor can compensate the ray offset caused by jittering of the mobile terminal, so that the photographed object is eventually imaged clearly on the image sensor of the second camera module, thereby improving the photographing performance of the mobile terminal.

It is noted that the motion sensor is connected to the first driver chip and the second driver chip.

In this embodiment, optionally, the first camera module and the second camera module are a front-facing camera and a rear-facing camera respectively, or the first camera module and the second camera module are a rear-facing camera and a front-facing camera respectively. The first target driving direction is opposite to the second target driving direction.

It is noted that the front-facing camera is a camera module whose lens is in the same plane as the screen of the mobile terminal, and the rear-facing camera is a camera module whose lens is in the same plane as the battery hatch cover.

The table below illustrates the correspondence between the directions of movement with respect to the coordinate axes in the preset reference coordinate system and the driving directions of the first image stabilization lens and the correspondence between the directions of movement with respect to the coordinate axes in the preset reference coordinate system and the driving directions of the second image stabilization lens. The first image stabilization lens is the image stabilization lens in the front-facing camera and the second image stabilization lens is the image stabilization lens in the rear-facing camera.

| Direction of movement with respect to a coordinate axis | Driving direction of the first image stabilization lens | Driving direction of the second image stabilization lens |
| --- | --- | --- |
| X⁺ | down | up |
| X⁻ | up | down |
| Y⁺ | right | left |
| Y⁻ | left | right |

Here, it is noted that, in this table, X⁻ represents a direction of clockwise rotation around the X-axis, i.e. the negative direction of the X-axis, and Y⁻ represents the direction of clockwise rotation around the Y-axis, i.e., the negative direction of the Y-axis. The "down" represents that the driving direction of the image stabilization lens is downward. The "downward" means the image stabilization lens moves downward with respect to the central axis of the image sensor. The "up" represents that the driving direction of the image stabilization lens is upward. The "upward" means the image stabilization lens moves upward with respect to the central axis of the image sensor. The "right" represents that the driving direction of the image stabilization lens is to the right. The "to the right" means that the image stabilization lens moves in a direction toward the image sensor. The "left" represents that the driving direction of the image stabilization lens is to the left. The "to the left" means that the image stabilization lens moves in a direction away from the image sensor.

On the basis of the above embodiment shown in FIG. 4, in another optional implementation, the mobile terminal includes a third camera module with a rotation angle range from 0° to 180°, and the motion sensor is provided on the main printed circuit board.

In case that the target camera module in the photographing state is the third camera module, the driver chip or the processor is specifically configured to: acquire a direction of movement of the mobile terminal and a current rotation angle of the third camera module; determine a third target driving direction corresponding to the direction of movement according to a preset third correspondence, corresponding to the current rotation angle, between driving directions of the image stabilization lens and directions of movement with respect to coordinate axes in the preset reference coordinate system; and control the image stabilization driving motor to drive the image stabilization lens to move in the third target driving direction.

It is noted that, if the rotation angle of the third camera module varies, then the corresponding third correspondence between the driving directions of the image stabilization lens and the directions of movement with respect to the coordinate axes in the preset reference coordinate system varies.

Here, the third camera module serves as the rear-facing camera in case that the current rotation angle of the third camera module is 0°; and the third camera module serves as the front-facing camera in case that the current rotation angle of the third camera module is 180°. A target driving direction corresponding to the third camera module acting as the rear-facing camera is opposite to a target driving direction corresponding to the third camera module acting as the front-facing camera.

Here, in case that the third camera module serves as the rear-facing camera, the preset third correspondence between the driving directions of the image stabilization lens and the directions of movement with respect to the coordinate axes in the preset reference coordinate system is the second correspondence or the first correspondence in the foregoing embodiments.

In case that the third camera module serves as the front-facing camera, the preset third correspondence between the driving directions of the image stabilization lens and the directions of movement with respect to the coordinate axes in the preset reference coordinate system is the first correspondence or the second correspondence in the foregoing embodiments.

In some embodiments of the present disclosure, by connecting a camera module capable of implementing at least two photographing modes to a motion sensor provided on the main printed circuit board of the mobile terminal, the optical image stabilization function of the camera module corresponding to two photographing modes in the mobile terminal may be achieved, thereby improving the photographing performance of the mobile terminal.

Figure 8:
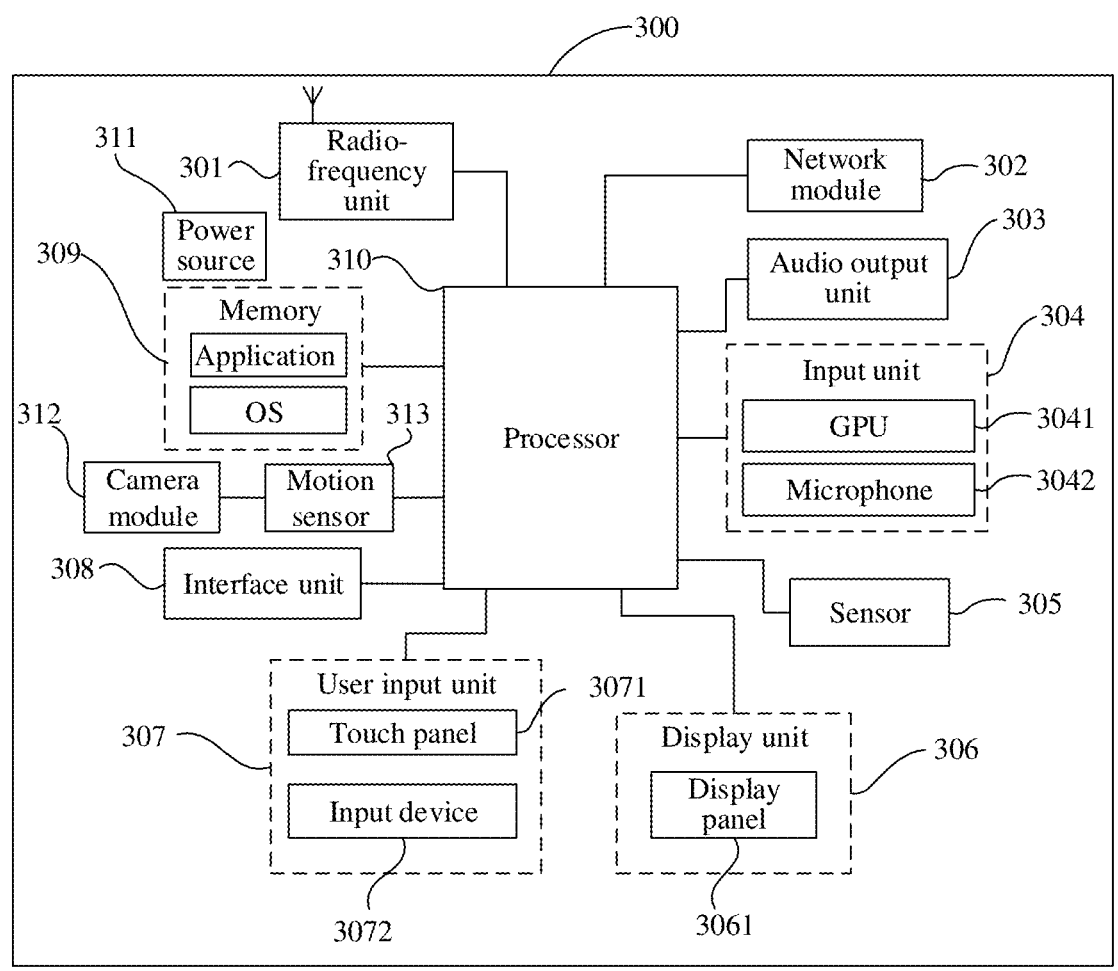
FIG. 8 is a schematic structural view of the hardware of a mobile terminal according to the present disclosure.

FIG. 8 is a schematic structural view of the hardware of a mobile terminal according to various embodiments of the present disclosure. The mobile terminal 300 includes, without limitation, a radio-frequency unit 301, a network module 302, an audio output unit 303, an input unit 304, a sensor 305, a display unit 306, a user input unit 307, an interface unit 308, a memory 309, a processor 310, and a power source 311. The mobile terminal 300 further includes a camera module 312 and a motion sensor 313, as shown in FIG. 8. As appreciated by those skilled in the art, the structure of the mobile terminal as shown in FIG. 8 does not constitute a limitation on the mobile terminal, and the mobile terminal may include more or fewer components than those shown, or some components may be combined, or components may have different layouts. In some embodiments of the present disclosure, the mobile terminal includes, without limitation, a mobile phone, a tablet computer, a notebook computer, a palmtop computer, an in-vehicle terminal, a wearable device, a pedometer, or the like.

The processor 310 is configured to: acquire a direction of movement of the mobile terminal; determine a target driving direction of a lens in the photographing state according to the direction of movement; and drive the lens to move in the target driving direction.

The mobile terminal 300 can implement various processes implemented by the mobile terminal in the foregoing embodiments, which shall not be described again to avoid repetition.

With the mobile terminal 300 according to some embodiments of the present disclosure, not only the quantity of motion sensors can be decreased and the cost of the mobile terminal can be significantly reduced, but also the structural space of the mobile terminal can be saved, so that the mobile terminal is made lighter and slimmer. Also, optical image stabilization control of two or more camera modules in the mobile terminal is enabled and the photographing performance of the mobile terminal is improved.

It is understood, in some embodiments of the present disclosure, the radio-frequency unit 301 may be configured to receive and transmit signals during information transmission or during a call. Specifically, the radio-frequency unit 301 receives downlink data from a base station and transfers the data to the processor 310 for processing; and the radio-frequency unit 301 transmits uplink data to the base station. Generally, the radio-frequency unit 301 includes, but is not limited to: an antenna, at least one amplifier, a transceiver, a coupler, a low noise amplifier, a duplexer and the like. In addition, the radio-frequency unit 301 may be configured to communicate with a network or other device through a wireless communication system.

By means of the network module 302, the mobile terminal provides user with wireless broadband Internet access, such as sending and receiving emails, browsing webpages and accessing streamed media.

The audio output unit 303 may convert audio data received by the radio-frequency unit 301 or network module 302 or stored in the memory 309 into audio signals and output audibly. Moreover, the audio output unit 303 may provide audio outputs associated with the specific functions performed by the mobile terminal 300 (such as, incoming call ringtone, message received ringtone). The audio output unit 303 includes a speaker, a buzzer, a telephone receiver and the like.

The input unit 304 is configured to receive audio or video signals. The input unit 304 may include a graphics processing unit (Graphics Processing Unit, GPU) 3041 and a microphone 3042. The GPU 3041 processes image data such as still picture or video acquired by an image capture device (e.g., a camera) in a video capture mode or image capture mode. The processed image frames may be displayed on the display unit 306. The image frames processed by the GPU 3041 may be stored in the memory 309 (or other storage medium) or sent via the radio-frequency unit 301 or network module 302. The microphone 3042 may pick up sound and convert it into audio data. In a phone call mode, the processed audio data may be converted into a format suitable for transmission to a mobile communication base station via the radio-frequency unit 301 and output.

The mobile terminal 300 further includes at least one sensor 305, for example, an optical sensor, a motion sensor, among others. In specific, the optical sensor includes ambient light sensor and proximity sensor. The ambient light sensor may adjust a brightness of a display panel 3061 according to the ambient light conditions. The proximity sensor may deactivate a display panel 3061 and/or a backlight when the mobile terminal 300 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the mobile terminal (e.g., switch between portrait and landscape modes, related games, magnetometer posture calibration), vibration identification related function (e.g., pedometer, knock) and the like; the sensor 305 may further include a fingerprint sensor, a pressure sensor, an iris sensor, a molecule sensor, a gyroscope, a barometer, a hygrometer, a thermometer, an infrared sensor and the like, which is not described in detail herein.

The display unit 306 is configured to display information input by or presented to a user. The display unit 306 may include the display panel 3061. The display panel 3061 may be constructed in form of liquid crystal display (Liquid Crystal Display, LCD), organic light-emitting diode (Organic Light-Emitting Diode, OLED) and the like.

The user input unit 307 may be configured to receive input numerical information or character information, and generate key signal inputs related to the user configuration and function control of the mobile terminal. In specific, the user input unit 307 includes a touch panel 3071 and an input device 3072. The touch panel 3071, also known as touch screen, may detect the touches thereon or in the vicinity thereof performed by the user (such as touch operations performed on or in the vicinity of the touch panel 3071 by the user using a finger, stylus or any other suitable object or accessory). The touch panel 3071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 310, as well as receives and executes the commands from the processor 310. Further, the touch panel 3071 may be implemented in a variety of modes, such as resistance, capacitance, infrared and surface acoustic wave. In addition to the touch panel 3071, the user input unit 307 may include the input device 3072. In specific, the input device 3072 may include, but is not limited to: physical keyboard, functional keys (such as volume button, switch button, etc.), track ball, mouse, joystick, which is not described in detail herein.

Further, the touch panel 3071 may overlie the display panel 3061. Having detected a touch operation thereon or in the vicinity thereof, the touch panel 3071 conveys the detected touch signal to the processor 310 to categorize the touch event, and the processor 310 provides corresponding visual output on the display panel 3061 in accordance with the category of the touch event. Although, in FIG. 8, the touch panel 3071 and the display panel 3061 are provided as two separate parts to implement the input and output functions of the mobile terminal, the touch panel 3071 and the display panel 3061 may be integrated to implement the input and output functions of the mobile terminal in some embodiments, which is not limited herein.

The interface unit 308 is an interface by which an external device is connected to the mobile terminal 300. For example, the external device may include a wired or wireless headset port, an external power supply (or battery charger) port, a wired or wireless data port, a storage card port, a port configured to be connected to a device having an identification module, an audio input/output (Input/Output, I/O) port, a video I/O port, an earphone port and the like. The interface unit 308 may be configured to receive input (e.g., data information, power, etc.) from the external device and transfer the received input to one or more components in the mobile terminal 300, or may be configured to transmit data between the mobile terminal 300 and the external device.

The memory 309 may be configured to store software program and other data. The memory 309 may include generally a program storage area and a data storage area. The program storage area may store an operating system (Operating System, OS), an application required for at least one function (such as an audio playing function and an image playback function) and the like; the data storage area may store data (e.g., audio data, phone book, etc.) created according to usage of a mobile phone, and the like. Moreover, the memory 309 may include a cache, as well as a non-volatile storage, such as at least one magnetic disk storage device, flash memory or other non-volatile solid-state storage devices.

The processor 310 is a control center of the mobile terminal. The processor 310 is connected to various parts of the entire mobile terminal through various interfaces and lines, and performs various functions of the mobile terminal and processes data by executing or running software programs and/or modules stored in the memory 309 and invoking data stored in the memory 309, so as to achieve an overall monitoring of the mobile terminal. The processor 310 may include one or more processing units; optionally, the processor 310 may integrate an application processor and a modem, wherein the application processor is mainly responsible for executing an operating system, a user interface, an application, etc., while the modem is mainly responsible for handling wireless communication. It is understood, the modem may be not integrated in the processor 310.

The mobile terminal 300 may further include a power source 311 (e.g., a battery) providing power to various components. Optionally, the power source 311 may be logically connected to the processor 310 via a power management system, such that functions such as charging management, discharging management and power management may be achieved through the power management system.

In addition, the mobile terminal 300 include some functional modules not shown, which shall not be described in detail here.

Optionally, an embodiment of the present disclosure further provides a mobile terminal, which includes a processor, a memory, and a computer program stored in the memory and configured to be executed by the processor. The processor is configured to execute the computer program, to implement various processes of the embodiments of the lens control method and can achieve the same technical effects. No detailed description will be made here to avoid repetition.

An embodiment of the present disclosure further provides a computer-readable storage medium storing therein a computer program. The computer program is configured to be executed by a processor, to implement various processes of the embodiments of the lens control method and can achieve the same technical effects. No detailed description will be made here to avoid repetition. The computer-readable storage medium is, for example, a read-only memory (Read-Only Memory, ROM), random access memory (Random Access Memory, RAM), magnetic disk, optical disk, or the like. The computer-readable storage medium can be volatile or nonvolatile.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A lens control method, applied to a mobile terminal, comprising:
   acquiring a direction of movement of the mobile terminal;
   determining a target driving direction of a lens in a photographing state according to the direction of movement; and
   driving the lens to move in the target driving direction;
   wherein the lens is a lens in a target camera module in the photographing state; in case that the target camera module is a third camera module with a rotation angle range from 0° to 180° and comprising a third image stabilization lens, a third optical image stabilization motor connected to the third image stabilization lens and a third driver chip connected to the third optical image stabilization motor;
   the acquiring the direction of movement of the mobile terminal comprises: acquiring the direction of movement of the mobile terminal and a current rotation angle of the third camera module;
   the determining the target driving direction of the lens in the photographing state according to the direction of movement comprises: determining a third target driving direction that corresponds to the direction of movement according to a preset third correspondence, corresponding to the current rotation angle, between driving directions of the third image stabilization lens and directions of movement with respect to coordinate axes in a preset reference coordinate system;
   the driving the lens to move in the target driving direction comprises: controlling the third optical image stabilization motor to drive the third image stabilization lens to move in the third target driving direction.

2. The lens control method according to claim 1, wherein the third camera module serves as a rear-facing camera in case that the current rotation angle of the third camera module is 0°;
   the third camera module serves as a front-facing camera in case that the current rotation angle of the third camera module is 180°;
   wherein a target driving direction corresponding to the third camera module acting as the rear-facing camera is opposite to a target driving direction corresponding to the third camera module acting as the front-facing camera.

3. A mobile terminal, comprising:
   a motion sensor,
   a processor and N camera modules, wherein:
   N is a positive integer;
   the motion sensor is connected to at least one of the camera modules and the processor, and is configured to acquire a direction of movement of the mobile terminal;
   the processor is connected to the N camera modules;
   each of the camera modules comprises an image stabilization lens, an optical image stabilization motor connected to the image stabilization lens and a driver chip connected to the optical image stabilization motor; and
   the processor or the driver chip is configured to:
   acquire a direction of movement of the mobile terminal;
   determine a target driving direction of a lens in a photographing state according to the direction of movement; and drive the lens to move in the target driving direction;

wherein, the N camera modules comprise a third camera module with a rotation angle range from 0° to 180°, wherein the third camera module comprises a third image stabilization lens, a third optical image stabilization motor connected to the third image stabilization lens and a third driver chip connected to the third optical image stabilization motor; and the motion sensor is provided on a main printed circuit board;

wherein in case that a target camera module in the photographing state is the third camera module, the third driver chip or the processor is specifically configured to acquire a direction of movement of the mobile terminal and a current rotation angle of the third camera module; determine a third target driving direction that corresponds to the direction of movement according to a preset third correspondence, corresponding to the current rotation angle, between driving directions of the third image stabilization lens and directions of movement with respect to coordinate axes in a preset reference coordinate system; and control the third optical image stabilization motor to drive the third image stabilization lens to move in the third target driving direction.

4. The mobile terminal according to claim 3, wherein the processor or the driver chip is further
configured to determine a target driving direction of a lens in a target camera module that corresponds to the direction of movement according to a preset correspondence between lens driving directions and directions of movement with respect to coordinate axes in a preset reference coordinate system, wherein the preset reference coordinate system is used to represent the direction of movement of the mobile terminal.

5. The mobile terminal according to claim 3, wherein the motion sensor is provided on a main printed circuit board of the mobile terminal or in one of the camera modules.

6. The mobile terminal according to claim 3, comprising a first camera module and a second camera module; wherein the motion sensor is provided on a main printed circuit board of the mobile terminal; and the motion sensor is connected to the first camera module and the second camera module.

7. The mobile terminal according to claim 3, comprising a first camera module and a second camera module, wherein the motion sensor is provided inside the first camera module or the second camera module;
in case that the motion sensor is provided inside the first camera module, the motion sensor is connected to the second camera module;
in case that the motion sensor is provided inside the second camera module, the motion sensor is connected to the first camera module.

8. The mobile terminal according to claim 6, wherein the first camera module comprises a first image stabilization lens, a first optical image stabilization motor connected to the first image stabilization lens and a first driver chip connected to the first optical image stabilization motor;
in case that a target camera module in the photographing state is the first camera module, the first driver chip or the processor is specifically configured to acquire a first direction of movement of the mobile terminal; determine a first target driving direction of the first image stabilization lens that corresponds to the first direction of movement according to a preset first correspondence between driving directions of the first image stabilization lens and directions of movement with respect to coordinate axes in a preset reference coordinate system; and control the first optical image stabilization motor to drive the first image stabilization lens to move in the first target driving direction.

9. The mobile terminal according to claim 8, wherein the second camera module comprises a second image stabilization lens, a second optical image stabilization motor connected to the second image stabilization lens and a second driver chip connected to the second optical image stabilization motor;
wherein in case that the target camera module in the photographing state is the second camera module, the second driver chip or the processor is specifically configured to acquire a second direction of movement of the mobile terminal; determine a second target driving direction of the second image stabilization lens that corresponds to the second direction of movement according to a preset second correspondence between driving directions of the second image stabilization lens and directions of movement with respect to coordinate axes in the preset reference coordinate system; and control the second optical image stabilization motor to drive the second image stabilization lens to move in the second target driving direction.

10. The mobile terminal according to claim 9, wherein the first camera module and the second camera module are a front-facing camera and a rear-facing camera respectively, or the first camera module and the second camera module are a rear-facing camera and a front-facing camera respectively;
wherein the first target driving direction is opposite to the second target driving direction.

11. The mobile terminal according to claim 3, wherein the third camera module serves as a rear-facing camera in case that the current rotation angle of the third camera module is 0°;
the third camera module serves as a front-facing camera in case that the current rotation angle of the third camera module is 180°;
wherein a target driving direction corresponding to the third camera module acting as the rear-facing camera is opposite to a target driving direction corresponding to the third camera module acting as the front-facing camera.

12. The mobile terminal according to claim 7, wherein the first camera module comprises a first image stabilization lens, a first optical image stabilization motor connected to the first image stabilization lens and a first driver chip connected to the first optical image stabilization motor;
in case that the target camera module in the photographing state is the first camera module, the first driver chip or the processor is specifically configured to acquire a first direction of movement of the mobile terminal; determine a first target driving direction corresponding to the first direction of movement according to a preset first correspondence between driving directions of the first image stabilization lens and directions of movement with respect to coordinate axes in a preset reference coordinate system; and control the first optical image stabilization motor to drive the first image stabilization lens to move in the first target driving direction.

13. The mobile terminal according to claim 12, wherein the second camera module comprises a second image stabilization lens, a second optical image stabilization motor connected to the second image stabilization lens and a second driver chip connected to the second optical image stabilization motor;

in case that the target camera module in the photographing state is the second camera module, the second driver chip or the processor is specifically configured to acquire a second direction of movement of the mobile terminal; determine a second target driving direction corresponding to the second direction of movement according to a preset second correspondence between driving directions of the second image stabilization lens and directions of movement with respect to coordinate axes in the preset reference coordinate system; and control the second optical image stabilization motor to drive the second image stabilization lens to move in the second target driving direction.

14. The mobile terminal according to claim 13, wherein the first camera module and the second camera module are a front-facing camera and a rear-facing camera respectively, or the first camera module and the second camera module are a rear-facing camera and a front-facing camera respectively;

wherein the first target driving direction is opposite to the second target driving direction.

15. A mobile terminal, comprising a processor, a memory, and a computer program stored in the memory and configured to be executed by the processor, wherein the processor is configured to execute the computer program, to implement steps of the lens control method according to claim 1.

* * * * *